United States Patent
Du et al.

(10) Patent No.: US 12,467,769 B2
(45) Date of Patent: Nov. 11, 2025

(54) VEHICLE-ONBOARD COMPUTING ARCHITECTURE FOR SENSOR ALIGNMENT

(71) Applicant: GM GLOBAL TECHNOLOGY OPERATIONS LLC, Detroit, MI (US)

(72) Inventors: Xinyu Du, Oakland Township, MI (US); Guanlun He, Ann Arbor, MI (US); Yao Hu, Sterling Heights, MI (US); Binbin Li, Columbus, OH (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 553 days.

(21) Appl. No.: 17/947,244

(22) Filed: Sep. 19, 2022

(65) Prior Publication Data
US 2024/0095061 A1   Mar. 21, 2024

(51) Int. Cl.
*G01S 17/89* (2020.01)
*G01C 25/00* (2006.01)

(52) U.S. Cl.
CPC ............ *G01C 25/005* (2013.01); *G01S 17/89* (2013.01)

(58) Field of Classification Search
CPC .......... G06F 9/466; G06F 9/544; G01S 17/89; G01C 25/005; G01C 25/05
See application file for complete search history.

(56) References Cited

U.S. PATENT DOCUMENTS

| | | | |
|---|---|---|---|
| 2007/0067770 A1* | 3/2007 | Thomasson | G06F 9/52 718/100 |
| 2021/0067173 A1* | 3/2021 | Miele | G06F 11/1004 |
| 2021/0247506 A1* | 8/2021 | Knutson | G01S 17/86 |
| 2023/0046232 A1* | 2/2023 | Du | G01S 7/4972 |
| 2023/0213633 A1* | 7/2023 | Du | G01S 17/89 701/27 |
| 2024/0273741 A1* | 8/2024 | Du | G06T 7/337 |
| 2024/0292870 A1* | 9/2024 | Gahan | A23L 27/88 |

* cited by examiner

*Primary Examiner* — Jennifer Bahls
(74) *Attorney, Agent, or Firm* — CANTOR COLBURN LLP

(57) ABSTRACT

A computer-implemented method for aligning a sensor to reference coordinate system includes initiating a plurality of threads, each thread executes simultaneously and independent of each other. A first thread parses data received from the sensor and stores the parsed data in a data buffer. A second thread computes an alignment transformation using the parsed data to determine alignment between the sensor and the reference coordinate system. The computing includes checking that the data buffer contains at least predetermined amount of data. If at least the predetermined amount of data exists, an intermediate result is computed using the parsed data in the data buffer; otherwise, the second thread waits for the first thread to add more data to the data buffer. The second thread outputs the intermediate result into the data buffer. A third thread outputs the alignment transformation, in response to completion of alignment computations.

20 Claims, 4 Drawing Sheets

VEHICLE-ONBOARD COMPUTING ARCHITECTURE FOR SENSOR ALIGNMENT

INTRODUCTION

The subject disclosure relates to computing technology, particularly to calibrating sensors, such as a camera on a vehicle.

Vehicles (e.g., automobiles, trucks, construction equipment, farm equipment, etc.) may include one or more sensors, such as cameras, proximity sensors, motion sensors, RADARs, LIDARs, etc. The information from the sensors facilitates semi-autonomous or autonomous operation of the vehicle. The sensors can further facilitate providing back-up assistance, take images of the vehicle driver to determine driver drowsiness or attentiveness, images of the road as the vehicle is traveling for collision avoidance purposes, structure recognition, such as roadway signs, etc. It is critical to accurately calibrate the position and orientation of the sensors with respect to the vehicle. Because of manufacturing tolerances, a separate end-of-line sensor calibration, or aftermarket adjustment, is performed on each vehicle.

Some known sensor systems do not provide for calibration. Other sensor systems provide a pre-calibration approach where measurements are manually calibrated into the vehicle coordinates, such as by providing a checkerboard pattern of an image. However, these calibration techniques are typically time consuming and must be performed at a service location. Therefore, if the vehicle is traveling and the sensor position is altered, for example, because of a bump, an obstacle in the road, weather, or any other reason, the calibration will not be accurate until the vehicle is taken to the service location to be corrected.

Sensor calibration involves determining a set of parameters that relate coordinates associated with the sensor measurements to vehicle coordinates and vice versa. Some sensor parameters, such as focal length, optical center, refresh rate, etc., are stable (i.e., do not depend on the vehicle), while other parameters, such as orientation and position, are not. For example, the height of the sensors can depend on the load of the vehicle, which will change from time to time. This change can cause sensor measurements and results based on the sensor measurements to be inaccurate. Therefore, what is needed is a sensor calibration process that automatically calibrates less stable sensor parameters as the vehicle is being driven where the vehicle-sensors continually adapt themselves over time.

SUMMARY

In one exemplary embodiment a computer-implemented method for aligning a sensor to reference coordinate system includes initiating a plurality of threads, each thread executes simultaneously and independent of each other. The method further includes parsing, by a first thread, data received from the sensor. The method further includes storing, by the first thread, the parsed data in a data buffer. The method further includes computing, by a second thread, an alignment transformation using the parsed data from the data buffer to determine alignment between the sensor and the reference coordinate system. The computing includes checking that the data buffer contains at least predetermined amount of data. The computing further includes, in response to the at least predetermined amount of data in the data buffer, computing an intermediate result comprising portions of the alignment transformation using the parsed data in the data buffer. The computing further includes, in response to the at least predetermined amount of data not being in the data buffer, waiting for the first thread to add more data to the data buffer. The method further includes outputting, by the second thread, the intermediate result into the data buffer. The method further includes outputting, by a third thread, the alignment transformation, in response to completion of alignment computations.

In addition to one or more of the features described herein, in one or more embodiments, each thread is executed by a separate processing core.

In one or more embodiments, the plurality of threads is a first plurality of threads, and the method further includes initiating a second plurality of threads, each thread in the second plurality of threads executes simultaneously and independent of each other. The method further includes each thread in the second plurality of threads computes the transformation matrix for separate sensors.

In one or more embodiments, the second thread swaps between computing the alignment transformation for a first sensor and a second sensor.

In one or more embodiments, the second thread swaps between the first sensor and the second sensor after a predetermined period.

In one or more embodiments, parsing, by the first thread, data received from the sensor includes checking that the data buffer contains at least a predetermined amount of free space, and in response to the at least predetermined amount of free space in the data buffer, computing the parsed data to store in the data buffer. Further, in response to the at least predetermined amount of free space not being in the data buffer, the first thread waits for the second thread to use more data from the data buffer.

In one or more embodiments, the first thread also performs data reduction, which comprises down-sampling and conversion of data captured by the sensor.

In one or more embodiments, the sensor is one of a camera, a LIDAR, and a RADAR.

In one or more embodiments, the alignment transformation comprises one of a transformation matrix, a quaternion, and a set of parameters comprising roll, pitch, yaw, x-translation, y-translation, and z-translation.

In one or more embodiments, the sensor is mounted on a vehicle, and the reference coordinate system is that of the vehicle or of another sensor of the vehicle.

In another exemplary embodiment a system for aligning a sensor to a reference coordinate system includes a processor comprising a plurality of processing cores, and a memory device coupled with the processor. The processor is configured to align the sensor and the reference coordinate system by performing a method that includes initiating a plurality of threads, each thread executes simultaneously and independent of each other. The method further includes parsing, by a first thread, data received from the sensor. The method further includes storing, by the first thread, the parsed data in a data buffer. The method further includes computing, by a second thread, an alignment transformation using the parsed data from the data buffer to determine alignment between the sensor and the reference coordinate system. The computing includes checking that the data buffer contains at least predetermined amount of data. The computing further includes, in response to the at least predetermined amount of data in the data buffer, computing an intermediate result comprising portions of the alignment transformation using the parsed data in the data buffer. The computing further includes, in response to the at least predetermined amount of data not being in the data buffer, waiting for the first thread to add more data to the data buffer. The method further includes outputting, by the second thread, the intermediate result into the data buffer. The method further includes outputting, by a third thread, the alignment transformation, in response to completion of alignment computations.

In addition to one or more of the features described herein, in one or more embodiments, each thread is executed by a separate processing core.

In one or more embodiments, the plurality of threads is a first plurality of threads, and the method further includes initiating a second plurality of threads, each thread in the second plurality of threads executes simultaneously and independent of each other. The method further includes each thread in the second plurality of threads computes the transformation matrix for separate sensors.

In one or more embodiments, the second thread swaps between computing the alignment transformation for a first sensor and a second sensor.

In one or more embodiments, parsing, by the first thread, data received from the sensor includes checking that the data buffer contains at least a predetermined amount of free space, and in response to the at least predetermined amount of free space in the data buffer, computing the parsed data to store in the data buffer. Further, in response to the at least predetermined amount of free space not being in the data buffer, the first thread waits for the second thread to use more data from the data buffer.

In one or more embodiments, the first thread also performs data reduction, which comprises down-sampling and conversion of data captured by the sensor.

In yet another exemplary embodiment a vehicle includes a sensor, a processor comprising a plurality of processing cores, and a memory device coupled with the processor. The processor is configured to align the sensor to a reference coordinate system by performing a method. The method includes initiating a plurality of threads, each thread executes simultaneously and independent of each other. The method further includes parsing, by a first thread, data received from the sensor. The method further includes storing, by the first thread, the parsed data in a data buffer. The method further includes computing, by a second thread, an alignment transformation using the parsed data from the data buffer to determine alignment between the sensor and the reference coordinate system. The computing includes checking that the data buffer contains at least predetermined amount of data. The computing further includes, in response to the at least predetermined amount of data in the data buffer, computing an intermediate result comprising portions of the alignment transformation using the parsed data in the data buffer. The computing further includes, in response to the at least predetermined amount of data not being in the data buffer, waiting for the first thread to add more data to the data buffer. The method further includes outputting, by the second thread, the intermediate result into the data buffer. The method further includes outputting, by a third thread, the alignment transformation, in response to completion of alignment computations.

According to one or more embodiments, the plurality of threads is a first plurality of threads, and the method further includes initiating a second plurality of threads, each thread in the second plurality of threads executes simultaneously and independent of each other. The method further includes each thread in the second plurality of threads computes the transformation matrix for separate sensors.

According to one or more embodiments, the second thread swaps between computing the alignment transformation for a first sensor and a second sensor, the second thread swaps between the first sensor and the second sensor after a predetermined period.

According to one or more embodiments, parsing, by the first thread, includes checking that the data buffer contains at least a predetermined amount of free space, and in response to the at least predetermined amount of free space in the data buffer, computing the parsed data to store in the data buffer. In response to the at least predetermined amount of free space not being in the data buffer, the first thread waits for the second thread to use more data from the data buffer.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
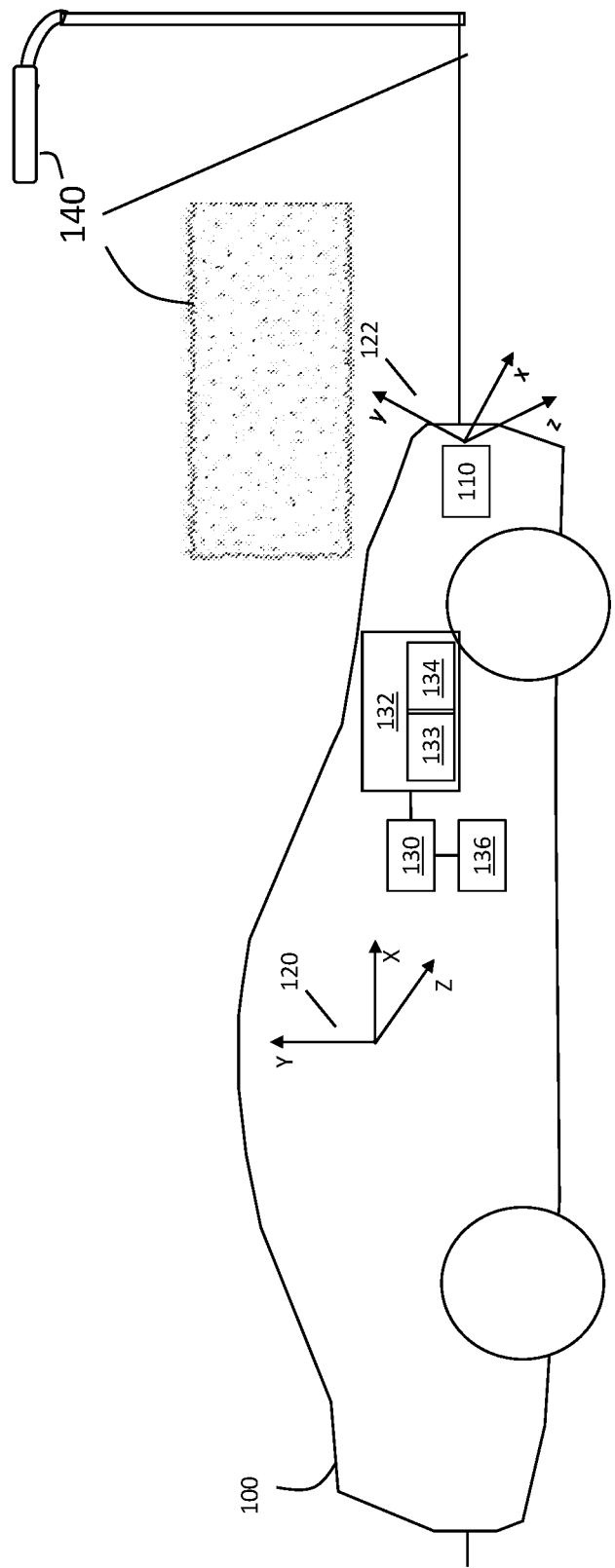
FIG. 1 is a block diagram of a vehicle that implements on-board alignment of a sensor according to one or more aspects.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, a system and method are disclosed for calibrating one or more sensors on a vehicle dynamically, using an on-board computing system of the vehicle. In one or more embodiments, the calibration is performed as the vehicle is being driven.

Technical challenges with the dynamic sensor calibration include the limited computational resources available onboard a vehicle, and that the time afforded to complete the calibration and computations using the sensor measurements is stringent, such as at/substantially at real-time (i.e., at least 60 frames per second, 120 frames per second, or any other threshold being set). In some aspects, the amount of data from the sensors that is required for the calibration may exceed the amount of memory (e.g., volatile memory) available on the onboard computing system of the vehicle. Technical solutions provided by the aspects described herein address at least such technical challenges. Aspects of the technical solutions described herein facilitate a parallel computing architecture and memory management to optimize computational efficiency to achieve real-time calibration of the sensors using on-board computing systems of a vehicle. Particularly, one or more aspects of the technical solutions described herein facilitate optimization of an alignment process that is integral to the calibration of the sensors.

While several examples herein are described using a camera or a LIDAR as example sensors, it is understood that the technical solutions described herein are not limited thereto, and can be applied to any other types of sensor, such as RADARs, proximity sensors, location sensors, motion sensors, or any other sensors. Further, while the examples herein are described in the context of an automobile, the technical solutions herein can be applicable in other situations where computational resources are similarly limited.

In accordance with an exemplary embodiment, FIG. 1 is a block diagram of a vehicle 100 that implements on-board alignment of a sensor 110 according to one or more aspects. The exemplary vehicle 100 shown in is an automobile, however, technical solutions described herein are not limited thereto, and can be applicable to boats, construction equipment, farming equipment, trucks, or any other type of vehicle. The sensor 110 can be any type of sensor, such as RADAR, LIDAR, camera, proximity sensor, location sensors, motion sensors, location sensors, or any other sensor. Although only a single block is shown to depict sensor 110, in some aspects, the sensor 110 can include multiple sensors of the same or of different type. The numbers and locations of the sensor 110 are not intended to be limited by the exemplary illustration herein.

The vehicle 100 further includes a controller 130. The controller 130 may obtain information from the sensor 110, analyze the information, and control semi-autonomous or autonomous operation of the vehicle 100. Alternatively, or in addition, the controller 130 may provide one or more outputs based on the analysis of the information, for example, via a display, speakers, or any other such output devices (not shown). The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The controller 130 includes one or more processing units/cores that facilitate parallel computing using multiple threads. The controller 130 may include an arithmetic logic unit, a microprocessor, a general purpose controller or some other processor array to perform computations and provide electronic display signals to a display device. The controller 130 processes data signals and may support computing architectures including a complex instruction set computer ("CISC"), a reduced instruction set computer ("RISC") or a combination thereof. Although a single controller 130 is depicted, the vehicle 100 may include multiple controllers in one or more aspects.

The controller 130 is coupled with (or includes) a memory 132. The memory 132 may be a non-transitory computer readable memory. The memory 132 stores instructions or data that can be executed by the controller 130. The instructions or data contain computer source code for performing the technical solutions described herein. The memory 132 can include volatile memory (VM) 133, such as a dynamic random access memory (DRAM) device, a static random access memory (SRAM) device, flash memory, or any other memory device. In addition, or alternatively, the memory 132 includes a non-volatile memory (NVM) 134, such as a hard disk drive, a floppy disk drive, a CD-ROM device, a DVD-ROM device, a DVD-RAM device, a DVD-RW device, a flash memory device, or some other mass storage device for storing information on a more permanent basis.

The controller 130 and the memory 132 may be part of an electronic control unit (ECU). In some aspects, the controller 130 may be connected to one or more elements of the vehicle via a bus.

The vehicle 100 has a vehicle coordinate system 120, depicted by (X, Y, Z) and the sensor 110 has a separate coordinate system 122, depicted by (x, y, z). As noted herein, a technical challenge with using the sensor 110 is to align the two coordinate systems 120, 122 so that the actions taken by the controller 130 based on the analysis of the information from the sensor 110 is accurate for the vehicle 100. Such an alignment is part of calibrating the sensor 110.

In addition, alternatively, the alignment may be performed between two or more sensors alignment (e.g. camera to lidar), sensor to Ground alignment (e.g. camera to ground), or any other component alignments. For example, the technical solutions described herein facilitate aligning one or more components to a common frame of reference (e.g., the vehicle coordinate system 120). Once alignment to the common frame of reference is established, measurements from one component can be transformed into coordinate system of any other component that is also mapped to the common frame of reference.

The sensor 110 can facilitate detection and identification of objects 140 in the field of view of the sensor 110, and consequently in the field of view of the vehicle 100. Exemplary objects 140 in the field of view of the sensor 110 are shown, such as a road surface, a hedge row, a lamp post. It is understood that several other types of objects can be measured, detected, identified, represented digitally, and/or processed in one way or the other by the sensor 110. For example, other types of objects can include but not limited to trees, vehicles, pedestrians, buildings/structures, walls, barriers, cones, fences, etc.

It should be noted that the vehicle 100 may include an autonomous vehicle, a semi-autonomous vehicle, or Highly Automated Vehicle ("HAV"). For example, the controller 130 may operate as an advanced driver-assistance system (ADAS), which is operable to make the vehicle 100 an autonomous vehicle.

In one or more aspects, the vehicle 100 further includes a system control and diagnostics module 136. The system control and diagnostics module 136 verifies the status of the sensor 110, including that the sensor 110 is aligned with the vehicle 100. The verification may be performed at periodic intervals, in response to particular events (e.g., bumps of at least a certain threshold, servicing, opening/closing of one or more enclosures of the vehicle, such as the hood, vehicle being turned on/off, or any other such events). In one or more aspects, the occurrence of one or more events may be based on a sensor and/or based on a code (e.g., on-board diagnostic (OBD) code). In some aspects, the system control and diagnostics module 136 may initiate an alignment of the sensor 110 at a predetermined periodic interval (e.g., every 24 hours, every 6 hours, etc.). Alternatively, or in addition, the system control and diagnostics module 136 may initiate the alignment in response to the particular events. The system control and diagnostics module 136 initiates the alignment by sending a command/instruction to the controller 130.

Figure 2:
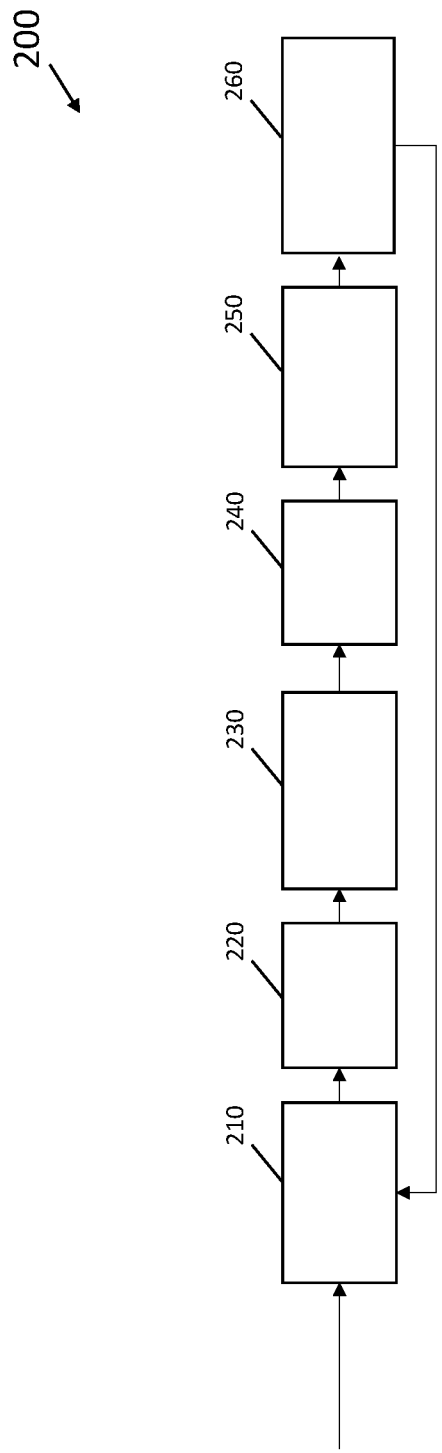
FIG. 2 depicts a flowchart of a method of alignment of a sensor according to one or more embodiments.

FIG. 2 depicts a flowchart of a method of alignment of a sensor, such as a camera, and a reference coordinate system according to one or more embodiments. As noted herein, the examples described use the vehicle's coordinate system 120 as the reference coordinate system, however, in other examples, the reference coordinate system can be that of another sensor. The method 200 is shown to start after capturing sensor information along with any peripheral information. The sensor information can include images in the case where the sensor 110 is a camera, or point clouds in the case of LIDARs, etc. The peripheral information can include parameters, such as vehicle speed, vehicle heading, vehicle acceleration, etc.

At block 210, the capture data is pre-processed. For example, data pre-processing can include noise filtering, removing outliers, smoothing, data formatting, feature construction etc. One or more known techniques can be used for the data pre-processing.

At block 220, feature detection and matching are performed. Feature detection and matching is a task in several computer vision applications, such as structure-from-motion, image retrieval, object detection, and more. One or more algorithms, such as Harris Corner Detector, Scale-Invariant Feature Transform (SIFT), Speeded-Up Robust Features (SURF), Features from Accelerated Segment Test (FAST), Binary Robust Independent Elementary Features (BRIEF), Oriented FAST and Rotated BRIEF (ORB), etc., can be used for the feature detection. Herein, "features" represent information obtained from the captured data and can include points, edges, or objects. Features may also be the result of an operation applied to the data. Feature detection and matching further includes generating a feature descriptor for each feature. The descriptor can be scale-invariant in several cases. In one or more aspects, the descriptor is a vector that represents one or more conditions associated with the corresponding feature. The first descriptor of a first feature is compared with a second descriptor of a second feature to determine if the two features match. The two features are deemed to match if the comparison result is above (or below) a predetermined threshold. For example, in the case of images, a set of pairs (Xi, Yi)↔(Xi', Yi') can be determined to be matching, where (Xi, Yi) is a feature in one image and (Xi', Yi') its matching feature in the other image.

Matching can be performed using one or more known algorithms, such as Brute-Force Matcher, Fast Library for Approximate Nearest Neighbors (FLANN), etc. In one or more aspects, normalization of the captured data and/or the detected features is performed prior to performing the matching.

It is understood that the feature detection and matching algorithms listed herein are exemplary, and that aspects of the technical solutions described herein are not limited only to those algorithms, rather can be used regardless of which algorithms is/are used.

At block 230, an essential matrix estimation and pose recovery is performed. In computer vision the "essential matrix" E relates corresponding points in two (or more) sets of captured data. Any known or future developed algorithm can be used to compute the essential matrix that facilitates determining both the relative position and orientation between two or more sensors and the position of corresponding points from two or more datasets. For example, in case of two images, E can facilitate determining the relative position and orientation between the camera(s) when the two images were captured and the 3D position of corresponding image points (i.e., features, or pixels).

At block 240, using the estimation matrix, 3D coordinates of the features are computed given corresponding normalized coordinates from the sensor (e.g., camera).

Further, at block 250, ground points selection and plane fitting (GPF) are performed. Because the sensor 110 is associated with the vehicle 100, the sensor information captured by the sensor 110 includes portions that capture the ground surface. Removal of such ground information reduces (significantly) the amount of data (e.g., number of points) that needs to be processed, thus, improving efficiency of the computations. Accordingly, a plane-fitting algorithm, such as RANdom Sample Consensus (RANSAC), is used to detect points that are from a plane that represents the ground as captured by the sensor 110. The detected ground points and plane are subsequently eliminated or bypassed from further computations, in one or more aspects.

Based on the GPF and the peripheral information, the controller 130 determines alignment results, at block 260. The alignment results can be expressed by characterizing the transformation (rotation+translation), for example, using either 6 parameters (x, y, z (height), roll, pitch, yaw), or a coordinate transformation matrix CTM, or quaternion. Examples herein use the CTM as the alignment results, however, any other form of expression can be used in one or more aspects. The alignment results indicate a transformation of a point captured by the sensor 110 form the sensor's coordinate system 122 to the vehicle's coordinate system 120 (and vice versa). It is essential that the controller uses a single coordinate system for uniformity and accuracy of computation results.

Accordingly, the above described method 200 for alignment of the sensor 110 with the vehicle 100 is critical to achieve accurate computations based on the sensor measurements.

Presently, such alignment is performed in an off-line manner, by taking the vehicle 100 to a designated station (e.g., manufacturing facility, service station, vehicle dealer, workshop, etc.), using specialized hardware and calibration targets/sheets. It should be noted that steps performed for such an off-line alignment may vary from the operations described herein for a dynamic alignment. Further, for such a designated alignment and/or calibration station, stringent requirements are to be met (e.g., leveling the floor, horizontal of the sensor 110, and the vehicle 100, placement of the target from the vehicle, lighting conditions, etc.). Such calibration process is both cumbersome and costly. In addition to requiring the special facilities, and sometimes for cost prohibitive reasons, such alignment may be provided only at a select few locations. Hence, user (e.g., owner, consumer, etc.) of the vehicle 100 may be forced to undertake lengthy and costly trips to have such a sensor alignment performed in case of repair/replacement, etc.

Technical solutions described herein address such challenges and provide an improvement to the alignment process for sensors and vehicles. Accordingly, technical solutions described herein provide a practical application to improve the alignment of sensors and vehicles and in turn, use of sensors by the vehicle to perform one or more functions based on analysis of the sensor information. Further yet, as will be evident from the description herein, technical solutions described herein provide improvements to computing technology, particularly architecture used for alignment of sensors with vehicles using an on-board computing device of a vehicle, where such on-board computing device has limited computing resources (e.g., memory, processing power, etc.).

Figure 3:
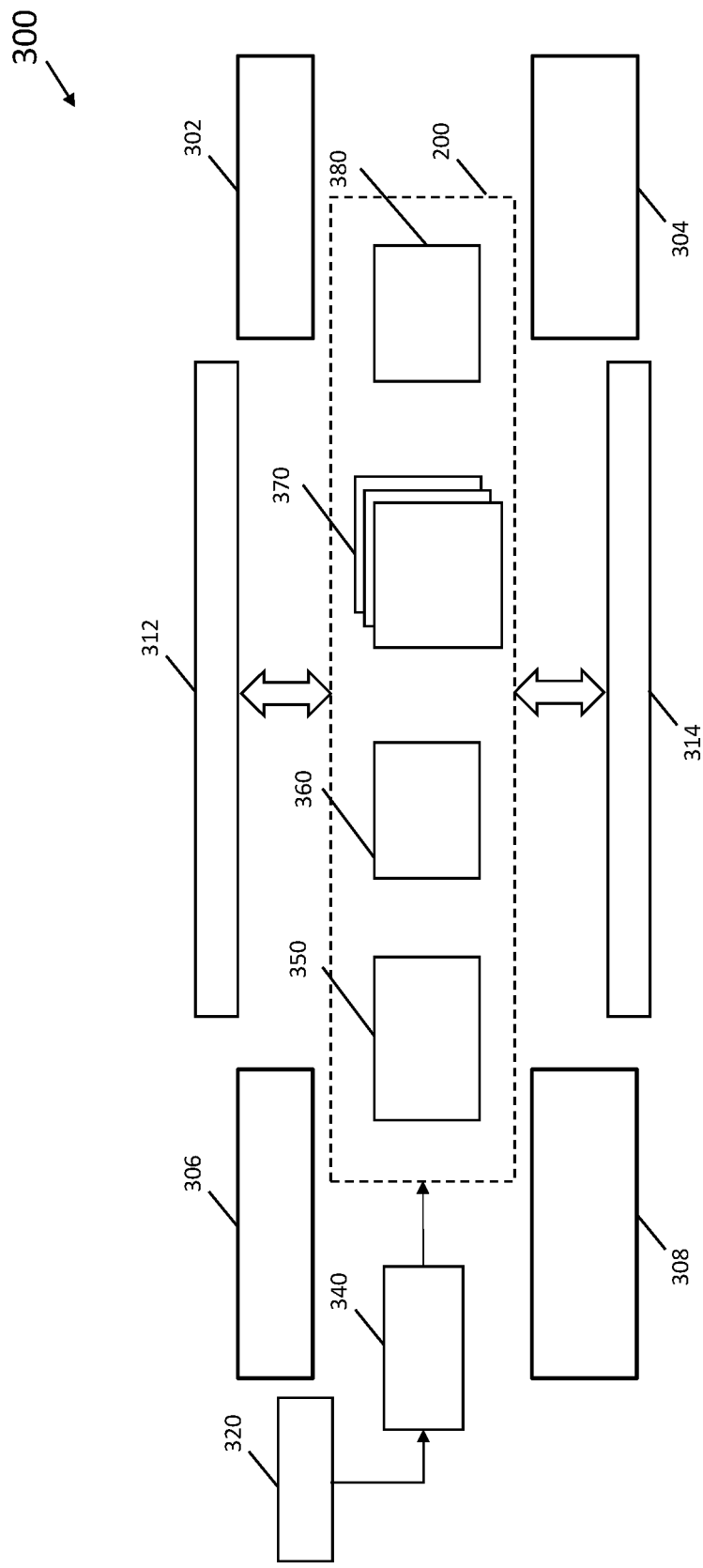
FIG. 3 depicts a block diagram of an example architecture for performing alignment of the sensor with the vehicle according to one or more embodiments.

FIG. 3 depicts a block diagram of an example architecture for performing alignment of the sensor with the vehicle according to one or more embodiments. The controller 130 uses the architecture 300 depicted to perform the sensor calibration, which includes the alignment 200 of the sensor 110 to the vehicle 100 (i.e., computing CTM between the coordinate system 122 and the coordinate system 120). Further, the alignment 200 can include aligning one sensor 110 to another sensor 110 (e.g., camera to LIDAR, first camera to second camera, etc.). In one or more aspects, alignment between a first sensor and a second sensor can be performed by independently aligning the first and the second sensor to the vehicle coordinate system 120, and then computing an alignment between the two sensors based on their independent mapping. Alternatively, or in addition, the two sensors can be aligned with each other directly using the technical solutions described herein. It should be noted that the examples herein use the vehicle's coordinate system 120 as one of the coordinate systems for alignment; however, in other aspects, the technical solutions herein can be performed using any other coordinate system, such as that of another sensor.

The one or more blocks that are depicted can be respective modules that are executed by the controller 130 in one or more aspects. In other aspects, the several blocks can be operations that are executed by the controller 130. It should be noted that the one or more blocks can be combined and/or separated in other aspects, and the division of the blocks shown herein is just one representation and should not be construed as being limiting.

The controller 130 uses parallel computing (302) using multiple threads to improve the efficiency of the computations and to enable the on-board alignment 200 of the sensor 110. In computing technology, "threads" are a way to split execution of a computer program into two or more simultaneously (or pseudo-simultaneously) running tasks/operations. Two (or more) threads may be executed by respective processing units (sometimes referred to as processing cores), in one or more aspects. The threads execute at the same time, with each processing unit executing a particular thread. In other aspects, two or more threads may also be executed by a single processing unit by using time-division multiplexing. The processing units may be part of the controller 130. In some aspects, the controller 130 may parallelize the execution of the alignment (and other operations) using both, separate processor per thread as well as multiplexing. Further, the controller 130 facilitates decoupling data parsing from the actual alignment-related operations (304), which further improves the computational efficiency of the alignment 200. Technical solutions herein also facilitate reducing the data (306) to be used for the alignment 200. Further yet, technical solutions herein use the memory 132, VM 133 and NVM 134, to facilitate dynamic thread controlling (308) based on a data buffer assigned for the alignment 200.

The controller 130 uses one or more data buffers 314 that are allocated for the alignment 200 in the VM devices of the memory 132. In addition, the controller 130 uses a data storage 312, which is allocated for the alignment 200 in the NVM devices of the memory 132.

The computer architecture 300 facilitates the controller 130 executing the method 200 for alignment of the sensor 110 and the vehicle 100 (i.e., computing the CTM between the first coordinate system 120 and the second coordinate system 122). The method 200, as executed using the computer architecture 300, is separated into several tasks that can be parallelized to enable the alignment to be performed using the limited resources of the on-board computing device of the vehicle 130.

Figure 4:
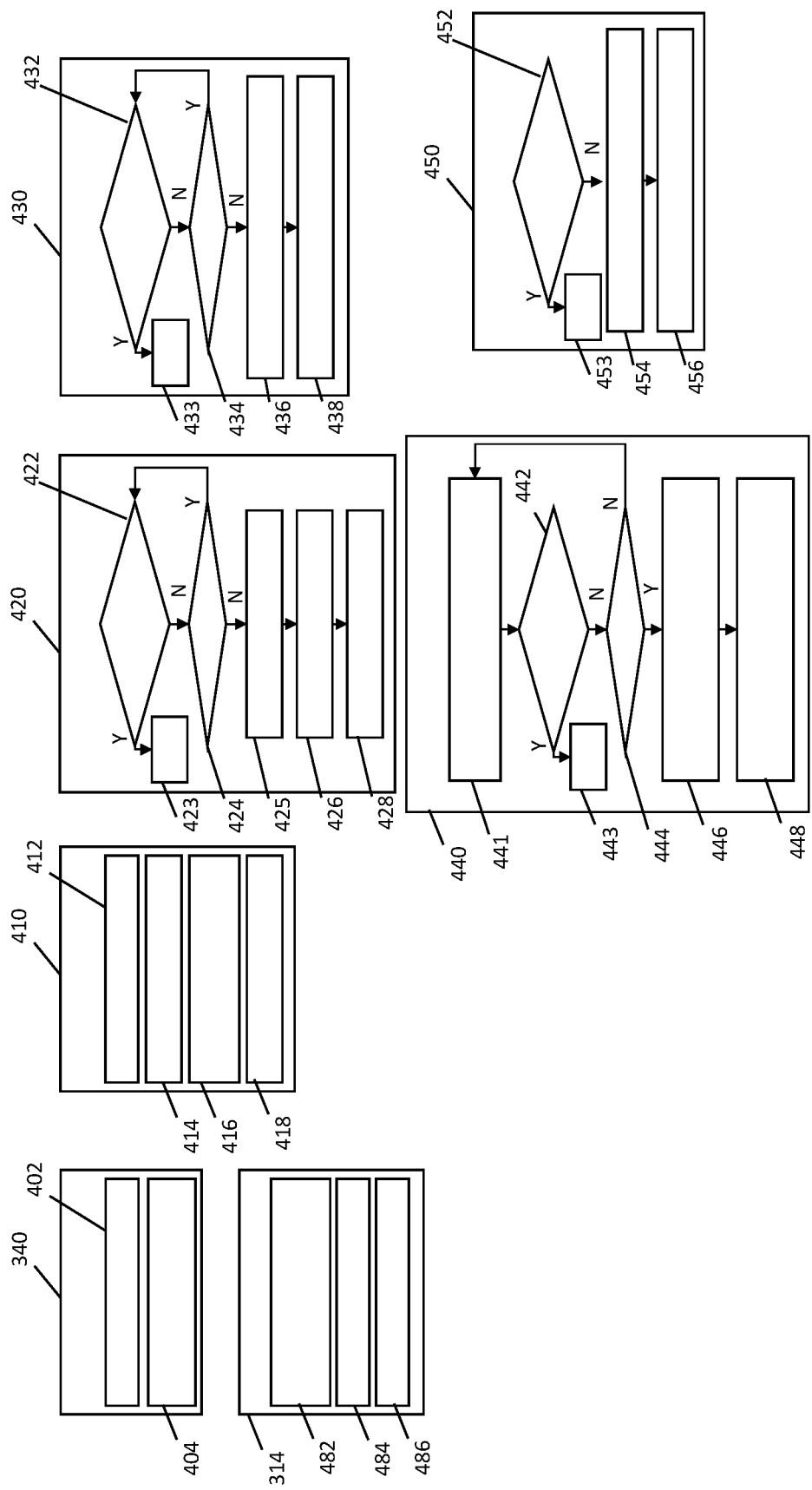
FIG. 4 depicts a flowchart of a parallelized alignment according to one or more embodiments.

FIG. 4 depicts a flowchart of a parallelized alignment 200 according to one or more embodiments. The parallelized alignment 200 is now described referring to FIG. 3 and FIG. 4. The one or more blocks depicted in FIG. 3 for the alignment 200 are expanded and the parallelism between the operations of the blocks are illustrated in FIG. 4 and described herein.

At the outset, at block 320, the alignment 200 is requested by the system control and diagnostics module 136 (e.g., by sending a command to the controller 130). As noted herein, the instruction may (or may not) be sent based on a verification of the sensor's 110 alignment status. Further, the instruction may (or may not) be sent in response to an event or according to a predetermined schedule.

At block 340, an initialization is performed. The initialization includes setting up a data structure for the CTM, which is a transformation matrix between the coordinate systems (120, 122) of the sensor 110 and the vehicle 100. The data structure can be an array, a linked-list, or any other type of matrix data structure. In one or more aspects, the CTM is created in the NVM 134. In some aspects, the initialization can further include setting up callbacks or other operational parameters that may be used during the alignment using stored values and/or memory addresses (e.g., pointers) based on the present execution of the alignment 200.

Execution of the alignment is started by spawning multiple threads, including a main thread 410, at block 404. The multiple threads spawned during the initialization provide a first level of parallelization (i.e., optimization). The multiple threads spawned further include a data-matching thread, a message-handling thread, an alignment-computation thread, and a message-publishing thread. In one or more aspects, a set of the above threads is created for each sensor 110 that is to be aligned. It is understood that the above listed threads is just one example of a set of threads into which the alignment is split, and that in other aspects of the technical solutions herein, additional, or fewer threads may be used.

The main thread 410, at block 412, creates a second CTM in the VM 133, and copies values of the CTM from the NVM 134. Further, at block 414, the main thread loads other parameters (e.g., peripheral information about the vehicle, values for computations, etc.) from the NVM 134 into the VM 133. In some aspects, the parameters can be read from other sensors and/or modules of the vehicle 100. At block 416, the main thread waits for the remaining threads (420, 430, 440, etc.) to complete computing the CTM in the VM 133. Once complete, at block 418, the main thread 410 copies values of the CTM from the VM 133 into the NVM 134.

The message-handling thread 420 is responsible for data parsing and reduction (350) on the data that is used for the alignment computation by other threads. The message-handling thread 420, at block 422, checks if the CTM computation has completed by the alignment-computation thread 440. If the computation is completed, the message-handling thread 420 exits, at 423. If the computation is still ongoing, at 424, checks if the data buffer 314 allocated in the VM 133 for the alignment 200 is full. To determine if the data buffer 314 is full, the message-handling thread 420 checks if at least a threshold amount of data (T1) is filled in the data buffer 314.

If the data buffer 314 is full, the message-handling thread 420 pauses and waits for the alignment computation to be completed (422). Instead, if the data buffer 314 is not full (i.e., less than T1 amount of data), the data parsing and reduction (350) is performed. At block 425, the received data, which includes sensor measurements and parameter information, is parsed. It should be noted that the received data does not include entirety of the captured sensor information (e.g., image, point cloud, etc.), rather only a portion of the data that has been captured (or not yet analyzed) since the last time the data was read and parsed.

The message-handling thread 420, at block 426 down-samples the read data. Down-sampling can be performed using a predetermined sampling algorithm (e.g., stochastically). Further, at block 428, the down-sampled data is converted into the format that is to be used for alignment computations. For example, in the case of a camera, the image data from the sensor 110 is converted into grayscale from color. Any other such conversions can be performed. The down-sampling and conversion reduces the size of the data. The message-handling thread 420 stores such reduced size data into the data buffer 314, which is accessible to all the threads that are working on the alignment of the sensor 110. It should be noted that the data buffer 314 may not be accessible to threads that are not working on the alignment 200 of the sensor 110 (e.g., working on alignment 200 of another sensor 110).

In one or more aspects, the data buffer 314 in the VM 133 includes a timestamped queue 482, which is used to store the data that is parsed and reduced in size. Each stored data is associated with a timestamp to facilitate the alignment computations to use the data chronologically.

The data-matching thread 430 is responsible for data matching (360) the data parsed by the message-handling thread 420 and stored in the data buffer 314. The data-matching thread 430, at block 432, checks if the CTM computation has completed by the alignment-computation thread 440. If the computation is completed, the data-matching thread 430 exits, at 433. If the computation is still ongoing, at 434, it is checked if the data buffer 314 allocated in the VM 133 for the alignment 200 is full. If the data buffer 314 is full, the data-matching thread 430 pauses and waits for the alignment computation to be completed (432). Instead, if the data buffer 314 is not full (i.e., less than T1 amount of data), the data matching (360) is performed. At block 436, the data matching is performed using time-stamped data 482 stored in the data buffer 314. The data matching can include feature matching algorithms using the timestamped data 482, for example, two or more sequential data captures.

Further, at block 438, from the matched data, only a subset of data is selected based on one or more conditions. The conditions can be based on the parameters of the vehicle 100. For example, if |steering_wheel_angle|<$\theta_2$ AND |acceleration|<$\theta_3$ AND speed>$\theta_4$, the enabling conditions are satisfied, and then the alignment process is performed. $\theta_2$, $\theta_3$ and $\theta_4$ are thresholds that are predetermined and can be configurable. The data matching results 484, which include the further reduced subset of the data, is stored in the data buffer 314.

The alignment-computation thread 440 is responsible for performing alignment computations 370. In some aspects, multiple alignment-computation threads 440 are spawned, one for each sensor 110. This affords a second level of parallelization (i.e., optimization). For example, if there are multiple cameras, one alignment-thread per camera is spawned, which computes a CTM for that particular camera. Alternatively, a single thread performs alignment computation for multiple sensors 110 (e.g., cameras). In the single thread case, the alignment-computation thread 440 is swapped from one sensor 110 to another, at block 441, for example using time-division multiplexing. In both cases, single-thread or multi-threaded alignment, the following operations are performed in the same manner.

The alignment-computation thread 440 checks if the CTM computation for the assigned sensor 110 is completed, at block 442. If the CTM computation is completed, the alignment-computation thread 440 exits, at block 443. Instead, if the computation is not complete, the amount of data in the data buffer is checked at block 444. If the data buffer is not filled beyond a certain threshold (T2, different from T1), the alignment computation is paused (441). If the data buffer is not filled with at least T2 amount of data, it is deemed that additional data has to be received (and parsed, reduced, etc.) before alignment computations can be performed.

If the data buffer 314 has enough data, at block 446, data is removed from the data buffer 314 and loaded (into cache memory) for performing the alignment computations. At block 448, the loaded data is used for performing one or more alignment computation algorithms, such as Camera-to-Ground, Camera-to-Camera, Lidar-to-Camera, etc., or a combination thereof using known or later developed algorithms. The alignment computations can further include plane fitting or other such techniques.

In one or more aspects, the alignment-computation thread 440 only performs a subset of operations required for the CTM computation. For example, the alignment-computation thread 440 only executes for a predetermined amount of time. Alternatively, the alignment-computation thread 440 only operates on the data stored in the data buffer 314. The intermediate result 486 obtained from operating on the subset of the data are stored in the data buffer 314.

The message-publishing thread 450 is responsible for results publishing (380). The message-publishing thread 450 checks if the CTM computation is completed, at block 452. If the CTM computation is completed, the message-publishing thread 450 exits, at block 453. Instead, if the computation is not complete, the message-publishing thread 450 provides a status update, at block 454. In one or more aspects, the status update is provided to the system control and diagnostics module 136. The status update includes at least an alignment/misalignment status, a diagnostic status, and a learn status. The alignment (or misalignment) status indicates if the sensor 110 is aligned with the vehicle 100. The diagnostic status indicates if the sensor 110 is alignable, or if a repair/replacement is required. The learn status indicates if the alignment 200 is completed and if the alignment succeeded or failed. Other types of status update can also be provided.

At block 456, the CTM is published. The CTM provides the transformation that is to be performed to align a point from the sensor's coordinate system 122 to the vehicle's 100 coordinate system 120 (or vice versa). The CTM is used for further analysis that uses the captured measurements from the sensor 110. For example, the CTM can be used for perception analysis, ADAS, and/or several other operations that use the measurements from the sensor 110.

Accordingly, the alignment 200 of the sensor 110 with the vehicle 100 can be performed using on-board limited computing resources using improved memory management and parallel computing as described herein. The technical solutions described herein provide improvements over existing techniques by allowing data analysis to be performed within real-time constraints (e.g., less than 25 milliseconds or similar threshold) compared to 60+ milliseconds required with existing (non-parallelized) techniques. One of the reasons to achieve the improvement includes the data parsing and reduction being performed on a separate thread (410), independent of the alignment computations (440). The alignment computations themselves also occur faster with the parallelization providing a 3× improvement, and reduced memory requirements. The reduced memory requirements are a result of processing the data in batches, from the data buffer 314.

Technical solutions described herein provide improvements to computer architecture used for performing alignment of sensor with the vehicle. The technical solutions described herein provide a practical application of enabling the alignment of the sensor to be performed in a dynamic and real-time manner using on-board computing resources of the vehicle. This avoids the consumer from spending time, costs, and other resources to have the sensor alignment performed at special destination.

The terms "a" and "an" do not denote a limitation of quantity, but rather denote the presence of at least one of the referenced item. The term "or" means "and/or" unless clearly indicated otherwise by context. Reference throughout the specification to "an aspect," means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A computer-implemented method for aligning a sensor to reference coordinate system in a vehicle, the computer-implemented method comprising:
   initiating a plurality of threads, each thread executes simultaneously and independent of each other;
   parsing, by a first thread, data received from the sensor mounted on the vehicle;
   storing, by the first thread, the parsed data in a data buffer;
   computing, by a second thread, an alignment transformation using the parsed data from the data buffer to determine alignment between the sensor and the reference coordinate system of the vehicle, the computing comprises:
   checking that the data buffer contains at least predetermined amount of data;
   in response to the at least predetermined amount of data in the data buffer, computing an intermediate result comprising portions of the alignment transformation using the parsed data in the data buffer;
   in response to the at least predetermined amount of data not being in the data buffer, waiting for the first thread to add more data to the data buffer;
   outputting, by the second thread, the intermediate result into the data buffer; and
   outputting, by a third thread, the alignment transformation, in response to completion of alignment computations to facilitate accurate sensor measurements for vehicle operation.

2. The computer-implemented method of claim 1, wherein each thread is executed by a separate processing core.

3. The computer-implemented method of claim 1, wherein the plurality of threads is a first plurality of threads, and the computer-implemented method further comprises:
   initiating a second plurality of threads, each thread in the second plurality of threads executes simultaneously and independent of each other; and
   each thread in the second plurality of threads computes the alignment transformation for separate sensors.

4. The computer-implemented method of claim 1, wherein the second thread swaps between computing the alignment transformation for a first sensor and a second sensor.

5. The computer-implemented method of claim 4, wherein the second thread swaps between the first sensor and the second sensor after a predetermined period.

6. The computer-implemented method of claim 1, wherein parsing, by the first thread, data received from the sensor comprises:
   checking that the data buffer contains at least a predetermined amount of free space;
   in response to the at least predetermined amount of free space in the data buffer, computing the parsed data to store in the data buffer; and
   in response to the at least predetermined amount of free space not being in the data buffer, waiting for the second thread to use more data from the data buffer.

7. The computer-implemented method of claim 1, wherein the first thread also performs data reduction, which comprises down-sampling and conversion of data captured by the sensor.

8. The computer-implemented method of claim 1, wherein the sensor is one of a camera, a LIDAR, and a RADAR.

9. The computer-implemented method of claim 1, wherein the alignment transformation comprises one of a transformation matrix, a quaternion, and a set of parameters comprising roll, pitch, yaw, x-translation, y-translation, and z-translation.

10. The computer-implemented method of claim 1, wherein the sensor is mounted on a vehicle, and the reference coordinate system is that of the vehicle or of another sensor of the vehicle.

11. A system for aligning a sensor to a reference coordinate system in a vehicle, the system comprising:
   a processor comprising a plurality of processing cores configured to operate within the vehicle;
   a memory device coupled with the processor, wherein the processor is configured to align the sensor and the reference coordinate system by performing a method comprising:
   initiating a plurality of threads, each thread executes simultaneously and independent of each other;

parsing, by a first thread, data received from the sensor mounted on the vehicle;

storing, by the first thread, the parsed data in a data buffer;

computing, by a second thread, an alignment transformation using the parsed data from the data buffer to determine alignment between the sensor and the reference coordinate system of the vehicle, the computing comprises:

checking that the data buffer contains at least predetermined amount of data;

in response to the at least predetermined amount of data in the data buffer, computing an intermediate result comprising portions of the alignment transformation using the parsed data in the data buffer;

in response to the at least predetermined amount of data not being in the data buffer, waiting for the first thread to add more data to the data buffer;

outputting, by the second thread, the intermediate result into the data buffer; and outputting, by a third thread, the alignment transformation, in response to completion of alignment computations to facilitate accurate sensor measurements for vehicle operation.

12. The system of claim 11, wherein each thread is executed by a separate processing core.

13. The system of claim 11, wherein the plurality of threads is a first plurality of threads, and the method further comprising:

initiating a second plurality of threads, each thread in the second plurality of threads executes simultaneously and independent of each other; and each thread in the second plurality of threads computes the alignment transformation for separate sensors.

14. The system of claim 11, wherein the second thread swaps between computing the alignment transformation for a first sensor and a second sensor.

15. The system of claim 11, wherein parsing, by the first thread, data received from the sensor comprises:

checking that the data buffer contains at least a predetermined amount of free space;

in response to the at least predetermined amount of free space in the data buffer, computing the parsed data to store in the data buffer; and in response to the at least predetermined amount of free space not being in the data buffer, waiting for the second thread to use more data from the data buffer.

16. The system of claim 11, wherein the first thread also performs data reduction, which comprises down-sampling and conversion of data captured by the sensor.

17. A vehicle comprising:

a sensor;

a processor comprising a plurality of processing cores;

a memory device coupled with the processor, wherein the processor is configured to align the sensor to a reference coordinate system by performing a method comprising:

initiating a plurality of threads, each thread executes simultaneously and independent of each other;

parsing, by a first thread, data received from the sensor;

storing, by the first thread, the parsed data in a data buffer;

computing, by a second thread, an alignment transformation using the parsed data from the data buffer to determine alignment between the sensor and the reference coordinate system, the computing comprises:

checking that the data buffer contains at least predetermined amount of data;

in response to the at least predetermined amount of data in the data buffer, computing an intermediate result comprising portions of the alignment transformation using the parsed data in the data buffer;

in response to the at least predetermined amount of data not being in the data buffer, waiting for the first thread to add more data to the data buffer;

outputting, by the second thread, the intermediate result into the data buffer; and outputting, by a third thread, the alignment transformation, in response to completion of alignment computations.

18. The vehicle of claim 17, wherein the plurality of threads is a first plurality of threads, and the method further comprising:

initiating a second plurality of threads, each thread in the second plurality of threads executes simultaneously and independent of each other; and each thread in the second plurality of threads computes the alignment transformation for separate sensors.

19. The vehicle of claim 17, wherein the second thread swaps between computing the alignment transformation for a first sensor and a second sensor, the second thread swaps between the first sensor and the second sensor after a predetermined period.

20. The vehicle of claim 17, wherein parsing, by the first thread, data received from the sensor comprises:

checking that the data buffer contains at least a predetermined amount of free space;

in response to the at least predetermined amount of free space in the data buffer, computing the parsed data to store in the data buffer; and in response to the at least predetermined amount of free space not being in the data buffer, waiting for the second thread to use more data from the data buffer.

* * * * *